(12) United States Patent
Zhang

(10) Patent No.: US 10,932,046 B2
(45) Date of Patent: Feb. 23, 2021

(54) SOUND GENERATOR

(71) Applicant: AAC Technologies Pte. Ltd., Singapore (SG)

(72) Inventor: Tong Zhang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/524,097

(22) Filed: Jul. 28, 2019

(65) Prior Publication Data

US 2020/0045438 A1 Feb. 6, 2020

(30) Foreign Application Priority Data

Aug. 1, 2018 (CN) .......................... 201821243396.2

(51) Int. Cl.
*H04R 9/02* (2006.01)
*H02K 1/06* (2006.01)

(52) U.S. Cl.
CPC .............. *H04R 9/025* (2013.01); *H02K 1/06* (2013.01)

(58) Field of Classification Search
CPC . H04R 9/025; H04R 9/06; H04R 9/02; H04R 1/288; H04R 1/2811; H04R 2400/11; H04R 2400/15; H04R 1/1021
See application file for complete search history.

(56) References Cited

U.S. PATENT DOCUMENTS 3,079,472 A * 2/1963 Sariti .................... H04R 9/025
 381/420
2017/0006384 A1 * 1/2017 Wu ........................ H04R 9/025

* cited by examiner

*Primary Examiner* — Sunita Joshi
(74) *Attorney, Agent, or Firm* — W&G Law Group LLP

(57) ABSTRACT

The present invention provides a sound generator, including a magnetic circuit system having a magnet and a lower plate for carrying the magnet. The magnet includes a first surface opposite to the lower plate and a second surface opposite to the first surface. The first surface of the magnet protrudes to form a first bolt, the lower plate is provided with a lower plate jack matching with the first bolt, and the first bolt is inserted into the lower plate jack. The sound generator of the present disclosure improves the structural stability of the magnetic circuit system and is convenient for positioning.

4 Claims, 2 Drawing Sheets

SOUND GENERATOR

FIELD OF THE PRESENT DISCLOSURE

The embodiments of the invention relate to the electroacoustic components, in particular to a sound generator used in a portable device.

DESCRIPTION OF RELATED ART

Sound generators, also called sound generators, are widely used in portable electronic devices such as mobile phones, laptops, etc. With the rapid development of these portable electronic devices, people have higher and higher requirements for the performance of the sound generators. In addition, with the thinning development of mobile phones, the quality requirements for the sound generators in the mobile phones are becoming higher and higher. The sound generator is a playing device of the voice function and therefore its internal magnetic circuit system directly influences the improvement of the acoustic performance of the product.

In the sound generator of the related technology, the connection between the magnet and the lower plate, and the connection between the magnet and the pole plate are performed by glue with planar surfaces thereof attached to each other. When the sound generator drops, the structure is easy to have the problem that the glue loses effectiveness, which causes the disconnection between the pole plate and magnet, and the disconnection between the magnet and lower plate. The drop reliability is lower, and the structure stability is poor, which badly affects the acoustic performance of the sound generator. Thus, it is necessary to provide improved sound generator to solve the problems mentioned above.

BRIEF DESCRIPTION OF THE DRAWINGS

Many aspects of the exemplary embodiment can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to exemplary embodiment. To make the technical problems to be solved, technical solutions and beneficial effects of the present disclosure more apparent, the present disclosure is described in further detail together with the figures and the embodiment. It should be understood the specific embodiment described hereby are only to explain the disclosure, not intended to limit the disclosure.

The following specific embodiment is provided to make the readers understand the contents of the present disclosure clearer and more thoroughly but not restrict the present disclosure, wherein, the upper, lower, left and right words indicating directions only refer to the position of the structure shown in the corresponding figure. The one near the center of the sound generator is defined inner side, and the one far from the center of the sound generator is defined the outer side.

Figure 1:
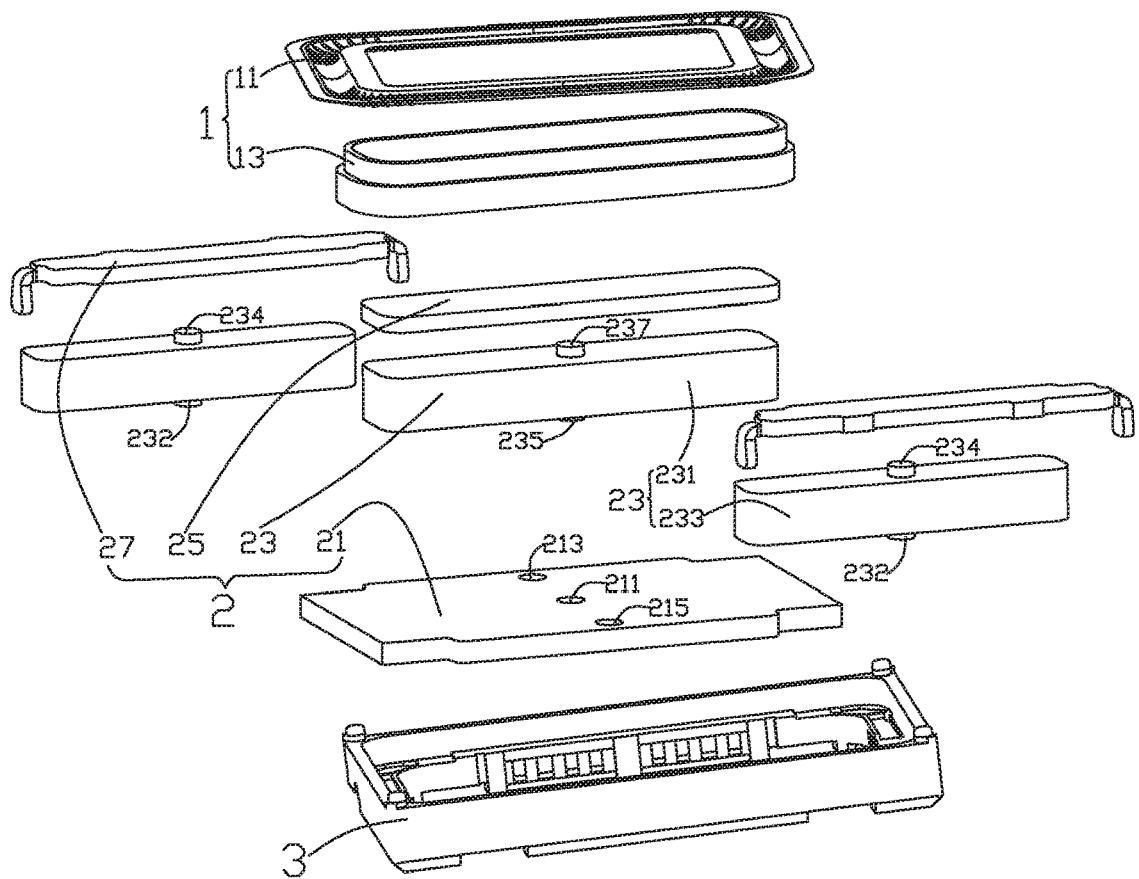
FIG. 1 is an isometric and exploded view of a sound generator in accordance with an exemplary embodiment of the invention.
Figure 2:
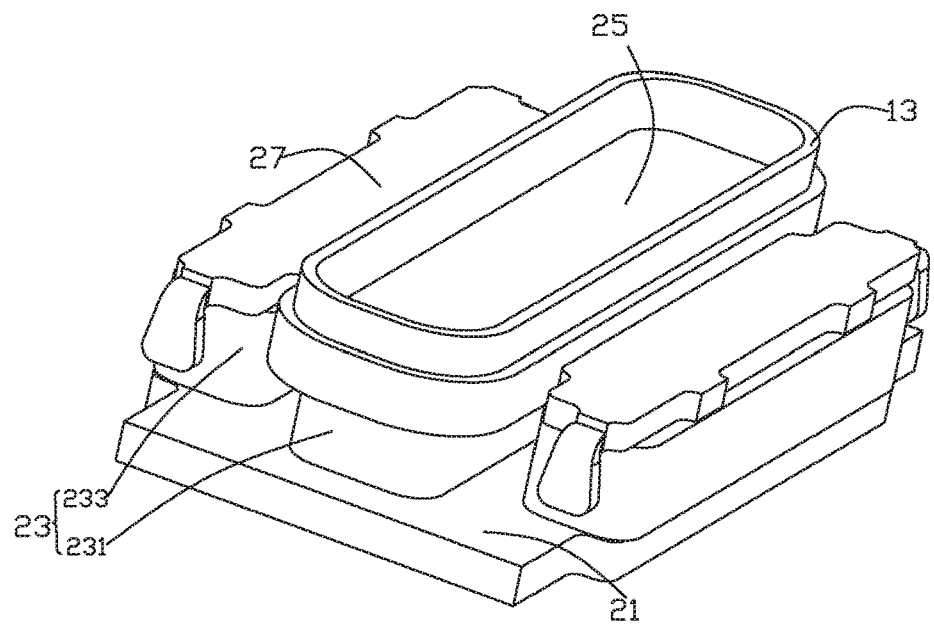
FIG. 2 an isometric view of a magnetic circuit system of the sound generator in FIG. 1.
Figure 3:
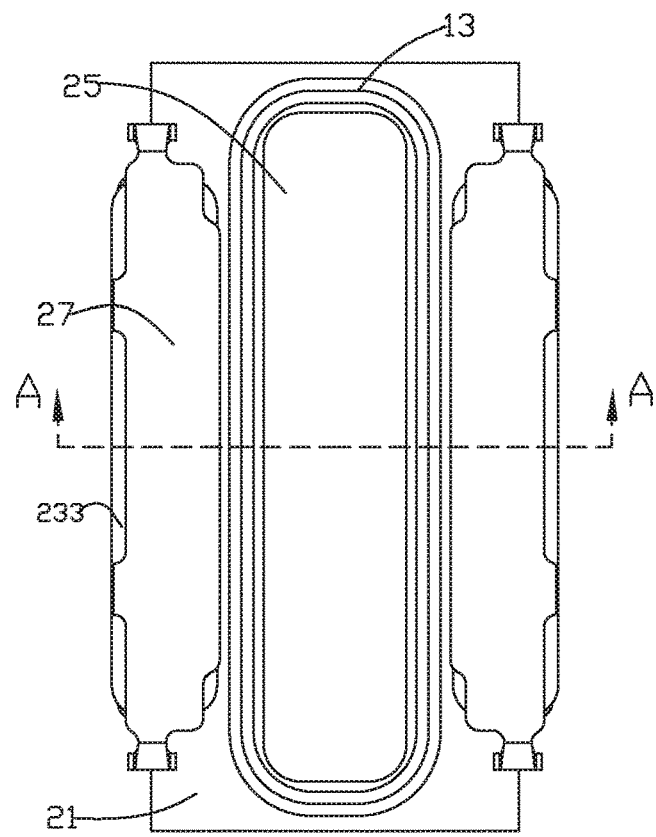
FIG. 3 is a top view of the magnetic circuit system.

As shown in FIGS. 1-3, the present disclosure provides a sound generator, which comprises a vibration system 1, a magnetic circuit system 2 below the vibration system 1 and a frame 3 to fix the magnetic circuit system 2. The vibration system 1 includes a diaphragm 11 fixed on one side of the frame 3 and a voice coil 13 to drive the diaphragm 11 to vibrate and generate sound. The magnetic circuit system 2 includes a magnet 23, a lower plate 21 for carrying the magnet 23, and a pole plate on a top of the magnet 23 deviating from lower plate 21. The magnet 23 includes a main magnet 231 and a side magnet 233 spaced from the main magnet 231. The pole plate includes a main pole plate 25 corresponding to the main magnet 231 and an upper plate 27 corresponding to the side magnet 233.

The structure of the magnetic circuit system 2 is improved by the present disclosure so that the pole plate will not be separated from the magnet 23 and the magnet 23 will not be separated from the lower plate 21 due to glue failure, and the specific embodiment is recited as follows.

In the present embodiment, a surface of the main magnet 231 engaged with the lower plate 21 (i.e., facing the lower plate 21) is defined as a first surface, and a surface of the main magnet 231 engaged with the main pole plate 25 (opposite from the first surface) is defined as a second surface. As shown in FIG. 2, the upper surface of lower plate 21 is attached with the main magnet 231 and side magnet 233 locating on both sides of main magnet 231 and spaced from the main magnet 231. The first and second surfaces of the main magnet 231 protrude respectively to form a first bolt 235 and a second bolt 237. The first bolt 235 protrudes downward the lower plate 21 from the lower surface of the main magnet 231 and the second bolt 237 protrudes towards the main pole plate 25 from the upper surface of main magnet 231. The upper surface of lower plate 21 is further provided with a first lower plate jack 211 matching the shape of the first bolt 235; the main pole plate 25 is provided with a pole plate jack 251 matching the shape of the second bolt 237. The first bolt 235 is inserted into the first lower plate jack 211 and the second bolt 237 is inserted into the pole plate jack 251 to form insertion contact, so that the main magnet 231 is fixed with the lower plate 21 and the main pole plate 25, and the contact area therebetween is increased, thus forming an insertion structure. The structure enhances the stability of the structure and the transfer area of the magnetic flux.

Figure 4:
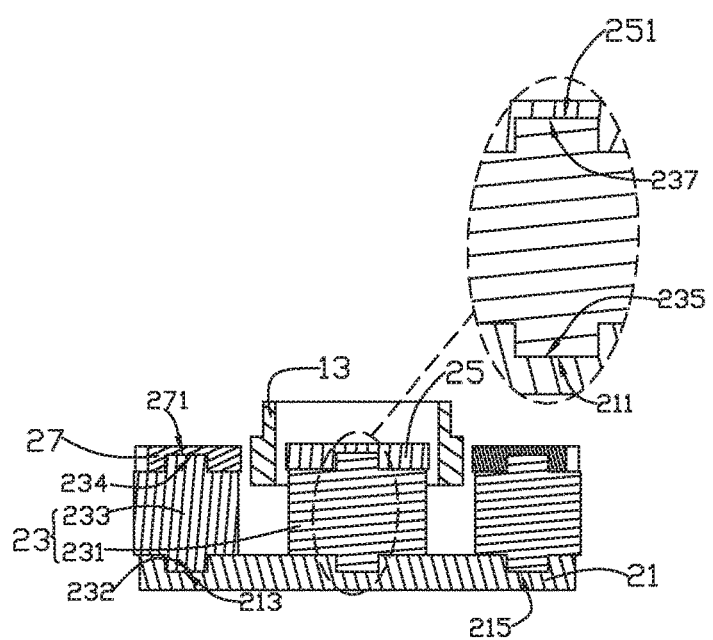
FIG. 4 is a cross-sectional view taken along line A-A in FIG. 3.

In addition, the lower plate 21 also includes a second lower plate jack 213 and a third lower plate jack 215 spaced from the first lower plate 211. In the embodiment, the first lower plate jack 211 is preferably located in the central area of the lower plate 21. The first lower plate jack 211, the second lower plate jack 213 and the third lower plate jack 215 are concave from the upper surface to the lower surface of the lower plate 21. These three jacks are distributed in the linear way and they can also be distributed in the triangular way, as shown in FIGS. 1 and 4. It should be noted that the jacks on the lower plate 21 (including the first lower plate jack 211, the second lower plate jack 213 and the third lower plate jack 215) and pole plate jack 251 can be through holes or blind holes.

Further, the hole depth of the first lower plate jack 211 is equal to the vertical distance the first surface of the main magnet 23 of the first bolt 235 protrudes towards the lower plate 21. The hole depth of the pole plate jack 251 is equal to the vertical distance the second bolt 237 protrudes from the second surface of the main magnet 23 toward the main pole plate 25. The hole depth of the first lower plate jack 211 is equal or unequal to that of the pole plate jack 251.

As shown in FIGS. 1 and 4, the upper plate 27 is stacked on the side magnet 233 and the upper plate 27 is fixed on the frame 3. The first surface of the side magnet 233 opposite to the lower plate 21 is provided with a third bolt 232 protruding from the first surface to the lower plate 21. The second surface of the side magnet 233 opposite to the upper plate 27 is provided with a fourth bolt 234. The upper plate 27 is provided with an upper plate jack 271 matching the shape of the fourth bolt 234. In the present embodiment, two side magnets 233 are provided and the two side magnets 233 are symmetrically arranged on both sides of the main magnet 231. Two third bolts 232 are inserted into the second lower plate jack 213 and the third lower plate jack 215 respectively. The two fourth bolts 234 are inserted into two upper plate jacks 271 respectively so that side magnet 233 and the upper plate 27 and the lower plate 21 are fixed in the inserting way. It should be noted that the upper plate jack 271 can be a through hole or a blind hole. The structure enhances the stability of the structure for processing and positioning, for avoiding expansion of gluing area due to assembly dislocation, and improving drop reliability.

In the case of fixed bonding, the contact area (i.e. bonding area) between the side magnet 233 and the upper plate 27 and the lower plate 21, between the main magnet 231 and the main pole plate 25 and the lower plate 21 can be increased by the concave-convex structure of the bolts and sockets, and bonding strength can be increased, and structural stability of magnetic circuit system can be improved accordingly.

As can be seen from FIG. 4, the hole depth of the second lower plate jack 213 can be equal or unequal to the vertical distance the third bolt 232 protrudes from the first surface of the side magnet 233 towards the lower plate 21. The hole depth of the upper plate jack 271 can be equal or unequal to the vertical distance the fourth bolt 234 protrudes from the second surface of the side magnet 233 towards the upper plate 27. The hole depth of the second lower plate jack 213 can be equal or unequal to the hole depth of the upper plate jack 271.

It should be noted that the hole depths of the first lower plate jack 211, the second lower plate jack 213 and the third lower plate jack 215 may be equal or unequal; in this embodiment, the cross-section of all the jacks can be circular, triangular, square, or in other shapes.

Further, the voice coil 13 is disposed around the main magnet 231, and draws the magnetic flux of the main magnet 231 out through the lower plate 21 and the main pole plate 25 to form magnetic field, so that the voice coil 13 is in the magnetic field. Specifically, the voice coil 13 is in ring shape and the voice coil 13 is partially located in the magnetic gap. After the voice coil 13 is electrified, the voice coil 13 vibrates due to Ampere Force produced by the magnetic field.

It is to be understood, however, that even though numerous characteristics and advantages of the present exemplary embodiment have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A sound generator, including;
a magnetic circuit system having a magnet and a lower plate for carrying the magnet, the magnet including a first surface opposite to the lower plate and a second surface opposite to the first surface; wherein
the first surface of the magnet protrudes to form a first bolt, the lower plate is provided with a lower plate jack matching with the first bolt, and the first bolt is inserted into the lower plate jack, the first bolt is arranged at a central position of the first surface.

2. The sound generator as described in claim 1, wherein the magnetic circuit system further includes a pole plate arranged on the second surface of the magnet, the second surface of the magnet protrudes to form a second bolt, the pole plate is provided with a pole plate jack matching with the second bolt, and the second bolt is inserted into the pole plate jack.

3. The sound generator as described in claim 2, wherein the second bolt is arranged at a central position of the second surface.

4. The sound generator as described in claim 2, wherein the magnet comprises a main magnet and a side magnet located on both sides of the main magnet, the pole plate comprises a main pole plate attached to the main magnet and an upper plate attached to the side magnet, and the main magnet and the side magnet are both provided with the first bolt and the second bolt; and wherein the lower plate jacks include a first lower plate jack matching with the first bolt of the main magnet, a second lower plate jack and a third lower plate jack matching with the first bolt of the side magnet; the pole plate jacks include a main pole plate jack matching with the second bolt of the main magnet and an upper plate jack matching with the second bolt of the side magnet.

* * * * *